(12) United States Patent
Eguchi

(10) Patent No.: US 6,184,644 B1
(45) Date of Patent: *Feb. 6, 2001

(54) DEFLECTION-ERROR-REDUCED POSITION CONTROL APPARATUS FOR BALL SCREW DRIVE SYSTEM

(75) Inventor: Satoshi Eguchi, Niwa-gun (JP)

(73) Assignee: Okuma Corporation, Nagoya (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/079,365

(22) Filed: May 15, 1998

(30) Foreign Application Priority Data

May 27, 1997 (JP) .................................. 9-136968

(51) Int. Cl.[7] .................................................. G05B 19/404
(52) U.S. Cl. ......................... 318/632; 318/624; 318/626; 318/630
(58) Field of Search ........................ 318/560, 619, 318/623, 624, 626, 630, 632, 638, 651, 652

(56) References Cited

U.S. PATENT DOCUMENTS

| | | | |
|---|---|---|---|
| 3,781,629 | * 12/1973 | Yashimoto et al. | 318/632 |
| 3,886,424 | * 5/1975 | Hoshina et al. | 318/630 |
| 4,345,194 | * 8/1982 | Green | 318/621 |
| 4,799,981 | * 1/1989 | Stone et al. | 156/64 |
| 5,059,881 | * 10/1991 | Fujita et al. | 318/630 |
| 5,159,254 | * 10/1992 | Teshima | 318/611 |
| 5,162,716 | * 11/1992 | Kyura et al. | 318/625 |
| 5,237,509 | * 8/1993 | Ueta et al. | 318/632 X |
| 5,432,422 | * 7/1995 | Nagano et al. | 318/611 |
| 5,704,250 | * 1/1998 | Black | 74/424.8 B |
| 5,742,140 | * 4/1998 | Yamada | 318/568.22 |
| 5,742,144 | * 4/1998 | Kato et al. | 318/630 |

FOREIGN PATENT DOCUMENTS 4-318603   11/1992   (JP) .

* cited by examiner

Primary Examiner—Bentsu Ro
(74) Attorney, Agent, or Firm—Oliff & Berridge, PLC

(57) ABSTRACT

In an apparatus for controlling the position of an object driven by a servomotor via a ball screw drive system, parameters of the ball screw drive system are determined from a position command value, an acceleration command value, a torque command value and a motor speed, based on which a dynamic deflection extent while the object is driven at an adjustable speed is calculated. To compensate for this dynamic deflection extent, a deflection compensation command section calculates a deflection compensation value, a deflection speed compensation value, and a deflection torque compensation value. These compensation values are added to their related sections in the position control apparatus individually and collectively compensate for the dynamic deflection.

33 Claims, 11 Drawing Sheets

US 6,184,644 B1

DEFLECTION-ERROR-REDUCED POSITION CONTROL APPARATUS FOR BALL SCREW DRIVE SYSTEM

BACKGROUND OF THE INVENTION

1. Field of the Invention

The present invention relates to a position control apparatus for a ball screw drive system.

2. Description of the Prior Art

FIG. 1 of the accompanying drawings shows a general mechanism of a ball screw drive system about one axis. When a servomotor 100 rotates, gear train 101a, 101b having a gear ratio of 1:n and serving as a reduction gear connected to the servomotor 100 also rotates. The larger gear 101b rotates a threaded portion of a ball screw (hereinafter also called the screw) 102, and this rotational motion is converted into a linear motion by a ball screw nut 103 (hereinafter simply called the nut). As the servomotor 100 rotates, both a table 104 connected to the nut 103 and a work 105 supported on the table 104 are moved axially of the ball screw 102 (hereinafter simply called "axially" or "longitudinally" by this conversion. The balls crew 102 is supported at opposite ends by a pair of brackets 107a, 107b via a motor-side bearing 106a and a counter-motor-side bearing 106b, the brackets 107a, 107b being rigidly connected to a machine frame. A motor position detector 108 is connected to the servomotor 100 to detect the motor position in rotation and, at the same time, to detect the position of an object (hereinafter also called the table position) indirectly.

In FIG. 1, L represents an entire length of the ball screw 102 and x represents a distance between the motor-side end of the screw 102 and the table position. Each of distances between the motor-side end of the screw 102, the gear shafts and the motor-side bearing 106a is negligibly small as compared to distance x on the motor-side leg of the stroke of the table 104. The distance between the gear shaft and the table position and the distance between the motor-side bearing 106a and the table position are designated by x. In a ball screw drive system which drives the table via this ball screw, the position, speed, and propulsive force of the table are indirectly controlled by controlling the rotational position, speed, and torque of the servomotor.

FIG. 2 is a block diagram of a conventional semi-closed position control apparatus employing a ball screw system as an object system. To this conventional position control apparatus, a position command value X from a non-illustrated host apparatus is given. In the semi-closed position control, the motor position xm is defined as a position feedback xf. A subtracter 50 calculates a position deviation (X−xf), and an amplifier 51 multiplies this calculated position deviation by a position loop gain Kv. A speed command value V, which is obtained by differentiating the position command value X by a differentiator 57, is added to the output of the amplifier 51 by an adder 52, whose output is to be used as a speed command input Vma. Another subtracter 54 subtracts a motor speed obtained by differentiating the motor position xm by a differentiator 53, from Vma to thereby calculate a speed deviation (V−vm). This speed deviation (V−vm) is amplified in proportional integration by a speed amplifier section 55. Simultaneously, a differentiator 58 differentiates the speed command value V to thereby calculate an acceleration command value A. Further, a value obtained by multiplying the acceleration command value A by a torque command conversion factor K1 is added to the amplified speed deviation as a torque command value τca by an adder 56.

A power amplifier section 60 composed of a non-illustrated power amplifier and a non-illustrated servomotor amplifies the torque command value τca into a motor output torque τ; its amplification factor is represented by a torque conversion constant Ct. An object system 61 is the ball screw drive system of FIG. 1, and the motor feed position xm indirectly the table position. These differentiators 57, 58, 59 constitute a feedforward system to realize an improved response of position control. S of the individual differentiator 57, 58, 59 stands for a Laplace operator defining a differential function.

The manner in which the torque is transmitted in the ball screw drive system will now be described using FIG. 3 and contrasted to FIGS. 1 and 2. FIG. 3 schematically shows a model of the ball screw drive system as converted with respect to the motor axis. The motor output torque τ is transmitted to the table via the motor gear train and the screw. Km and Kc are a torsional rigidity of the motor shaft and a torsional rigidity of the gear shaft, respectively, while Kb(x) is a torsional rigidity of the screw at a distance x from the motor-side end of the gear shaft to the table position. Km, Kc and Kb(x) collectively stand for an integrated torsional rigidity Kt existing between the motor and the table. A table transmission torque τr is a torque to be transmitted to the table, and the screw is subject to this torque reaction longitudinally, i.e., axially.

Kn is a thrust rigidity of the nut, and Kbl(x) and Kbr(x) are a motor-side thrust rigidity and a counter-motor-side thrust rigidity, respectively, at the distance x from the motor-side bearing on the screw to the table position. Likewise, Kgl and Kgr represent a motor-side thrust rigidity and a counter-motor-side-bearing thrust rigidity, respectively. Likewise, Krl and Krr each represent a thrust rigidity as substituted for the flexural rigidity when a beam is supported as a cantilever by the motor-side bracket or the counter-motor-side bracket. Ksl is a thrust rigidity on the motor side which is an integrated value of Krl, Kgl and Kbl(x); and Kisr is a thrust rigidity on the counter-motor-side which is an integrated value of Krr, Kgr and Kbr(x); and Ks is an integrated thrust rigidity existing between the table and the machine frame which rigidity is obtained by collecting Krl, Kgl, Kbl(x), Ksr, Krr, Kgr, Kbr(x) all together.

τd represents a turbulence torque (such as cutting torque or gravitational torque) acting outwardly from the table. Xm represents a feed position by the motor, xL represents a table movement position in the direction of rotation of the ball screw, and xo represents a starting position of the table in the direction axial of the ball screw; as a result, a real position (not shown) xi of the table is represented by xi=xL+xo. IL represents a load-side inertial moment (composite inertial moment of table plus work), and Is represents a motor-side inertial moment (composite inertial moment of motor plus gear plus screw). Torque, rigidity, position and inertial moment are all regarded as having the same converted value on the motor shaft.

The manner in which the ball screw drive system of FIG. 3 is operated at an adjustable speed in the conventional semi-closed position control apparatus will now be described. During the adjustable driving, a table transmission torque τr can be expressed by the following equation (1):

$$\tau r = IL \cdot L + \tau d \qquad (1)$$

wherein aL is a twice-differential of the movement position xL indicating an acceleration of the table movement. At the same time, a deflection expressed by the following equation (2):

$$xm - xL = \tau r / Kt$$
$$xo = -\tau r / Ks \qquad (2)$$

occurs in the ball screw drive system. Namely, between the feed position xm by the motor and the real position xi of the table, a position deviation expressed by the following equation (3), which is obtained from equation (2), occurs.

$$\begin{aligned} xm - xi &= xm - (xL + xo) \\ &= xm - xL - xo \\ &= (1/Ks + 1/Kt)\tau r \end{aligned} \qquad (3)$$

Thus, during the adjustable driving, the feed position xm by the motor and the real position xi of the table do not coincide. As a consequence, in the conventional semi-closed position control apparatus with a position feedback xf defined by the feed position xm, controlling the real position of the table in accordance with the position command value X much precisely, which is the objective of this conventional concept.

FIG. 4 is a block diagram of a conventional full-closed position control apparatus in which a non-illustrated direct position detector, such as a linear encoder, mounted on the ball screw drive system directly detects a real position xi of the table as a position feedback xf. In FIG. 4, parts or elements similar to those of FIG. 2 are designated by the same numbers and labeled with the same names, and their description is not repeated here. In this conventional apparatus, since the real position of the table is feedbacked, it is possible to regularly control the real position of the table in accordance with the position command value X, even if a position deviation due to the deflection of the ball screw drive system has occurred during adjustable driving. However, a responsibility is determined by a position loop gain Kv. The larger the loop gain Kv, the higher the responsibility; however, the set value of Kv is limited due to the integrated rigidity of the ball screw drive system and hence cannot be set so high usually. Therefore, when the table is driven at a non-constant speed, i.e., at an adjustable speed, it is particularly difficult to precisely control the real position of the table in accordance with the position command value X as the position deviation resulting from the deflection is influential on such control.

FIG. 5 is a block diagram showing another conventional full-closed position control apparatus. In FIG. 5, as for FIG. 4, parts or elements similar to those of FIG. 2 are designated by the same numbers and labeled with the same names, and their description is not repeated here. In this conventional full-closed position control apparatus, the feed position xm by the motor is subtracted from the real position xi of the table by a subtracter 62. A function unit 63 is added to the output of the subtracter 62, and the output is added to the feed position xm (by the motor) in an adder 64 to create a position feedback xf. For the function unit 63, a function G(s), such as a movement average process or a first-order lag process, is selected such that its output increases with lapse of time with respect to the step input to become normally: input=output.

Accordingly, by defining the position feedback so as to satisfy xf≈xm with respect to a high-frequency position command value X and so as to satisfy xf≈xi with respect to a low-frequency position command value X, this conventional apparatus directly controls the table position regularly with keeping the safety of the full-closed position control, which could not easily been realized until the development of this conventional technology. Even when such composite position feedback, it is impossible to control a possible position deviation, which might occur due to the deflection of the ball screw drive system during adjustable driving, likewise in the conventional apparatus of FIG. 2, as long as the position feedback satisfies xf≈xm. At that time, even if the position feedback satisfies xf≈xi, it is also difficult to control the position deviation, which is also true for likewise the conventional apparatus of FIG. 4. Even in the full-closed position control apparatus using a composite position feedback, because of influence of the position deviation due to the deflection, it is particularly difficult to precisely control the table position precisely in accordance with the position command value X.

As is understood from the foregoing description, when a ball screw drive system driving the table position through a ball screw is positionally controlled, a dynamic deflection resulting from an integrated rigidity existing between the table and the machine frame and an integrated torsional rigidity existing between the motor and the table would occur. In the conventional semi-closed position control apparatus, full-closed position control apparatus or full-closed position control apparatus using a composite position feedback, because of this dynamic deflection, it is difficult to control the table position at high precision in accordance with the position command value.

SUMMARY OF THE INVENTION

It is therefore an object of the present invention to provide a position control apparatus capable of controlling a table position much more precisely by compensating a possible dynamic deflection according to a position command value with high precision.

According to a first aspect of the invention, there is provided a position control apparatus for controlling the position of an object, which is driven via a ball screw drive system by a servomotor, based on a predetermined command, the apparatus having a deflection compensation command section for outputting at least one of the following values: a deflection compensation value, a deflection speed compensation value, and a torque compensation value, for compensating a control error due to a possible deflection of the ball screw drive system, said at least one compensation value being calculated based on at least one of: a position command value, an acceleration command value, and a torque command value.

The deflection compensation command section is equipped with a compensation extent determination section. The compensation extent determination section includes a parameter determination section (described below), a first amplifier for multiplying the acceleration command value by a reciprocal number of the integrated thrust rigidity calculated by the parameter determination section, a second amplifier for multiplying the acceleration command value by a reciprocal number of the integrated torsional rigidity calculated by the parameter determination section, an adder for obtaining a combined output of the first and second amplifiers, and a third amplifier for calculating a deflection extent by multiplying the output of the adder by the load-side inertial moment calculated by the parameter determination section.

Specifically, the parameter determination section includes an integrated thrust rigidity determination section for calculating an integrated thrust rigidity of the ball screw drive system based on the position command value; an integrated torsional rigidity determination section for calculating an integrated torsional rigidity of the ball screw drive system based on the position command value; and a load-side inertial moment determination section for calculating a current load-side inertial moment based on the acceleration command value, the torque command value, the current motor speed, the integrated thrust rigidity, the integrated torsional rigidity, and a load-side inertial moment in previous control cycle.

Further, the load-side inertial moment determination section includes a constant-acceleration period choosing section for sampling a constant-acceleration period based on the acceleration command value, a turbulence observer for calculating a turbulence torque based on the integrated thrust rigidity, the integrated torsional rigidity, the motor speed, the torque command value, and the previous load-side inertial moment calculated in the previous control cycle, and an inertial moment arithmetic section for calculating a load-side inertial moment in the chosen constant-acceleration period based on the acceleration command value, the turbulence torque, and the torque command value.

Furthermore, the deflection compensation command section includes a deflection acceleration compensation value calculation section for calculating a deflection acceleration compensation value by differentiating the deflection speed compensation value, and a torque compensation value calculation section for calculating a torque compensation value by differentiating the deflection speed compensation value and then multiplying the resulting differentiated value by a predetermined constant.

According to a second aspect of the invention, there is provided a semi-closed position control apparatus for controlling the position of an object, which is driven via a ball screw drive system by a servomotor, by feedbacking based on a position command value representing the position of the object and by substituting a feed position of the servomotor for the position of the object as a position feedback, the apparatus comprising: a speed command value calculation section for calculating a speed command value by differentiating the position command value; an acceleration command value calculation section for calculating an acceleration command value by differentiating the speed command value; a torque command value calculation section for calculating a torque command value, which is a position command value of the servomotor; a motor speed calculation section for calculating a motor speed based on the feed position of the servomotor; a deflection compensation command section for outputting a deflection compensation value, a deflection speed compensation value, and a deflection torque compensation value to compensate a control error due to a possible deflection of the ball screw drive system, such deflection occurring when the object is driven an adjustable speed, based on the position command value, the acceleration command value, the torque command value, and the motor speed; a position deviation calculation section for calculating a position deviation based on the position command value, the deflection compensation value and the position feedback; a speed deviation calculation section for calculating a speed deviation based on a value obtained by multiplying the position deviation by a predetermined constant, the speed command value, the deflection speed compensation value, and a speed feedback obtained by differentiating the position feedback; and the torque command value calculation section calculating the torque command value based on a value obtained by proportioning and integrating the speed deviation, a value obtained by multiplying the speed command value by a predetermined constant, and the deflection compensation value.

As the individual command values are corrected by the calculated corresponding compensation values, it is possible to reduce possible control errors that might have occurred due to the deflection of the ball screw drive system.

The present invention may be also applied to a full-closed position control apparatus employing a real position of the object as a position feedback. Namely, according to a third aspect of the present invention, there is provided a full-closed position control apparatus for controlling the position of an object driven via a ball screw drive system by a servomotor by feedbacking based on a position command value representing the position of the object and by employing a real position of the object as a position feedback, the apparatus comprising a speed command value calculation section for calculating a speed command value by differentiating the position command value; an acceleration command value calculation section for calculating an acceleration command value by differentiating the speed command value; a torque command value calculation section for calculating a torque command value, which is a position command value of the servomotor; a motor speed calculation section for calculating a motor speed based on the feed position of the servomotor; a deflection compensation command section for outputting a deflection speed compensation value and a deflection torque compensation value to compensate a control error due to a possible deflection of the ball screw drive system, such deflection occurring when the object is driven at an adjustable speed, based on the position command value the acceleration command value, the torque command value and the motor speed; a position deviation calculation section for calculating a position deviation based on the position command value and the position feedback; a speed deviation calculation section for calculating a speed deviation, based on a value obtained by multiplying the position deviation by a predetermined constant, the speed command value, the deflection speed compensation value and a speed feedback obtained by differentiating the position feedback; and the torque command value calculation section calculating the torque command value, based on a value obtained by proportioning and integrating the speed deviation, a value obtained by multiplying the speed command value by a predetermined constant, and the deflection speed compensation value. Since the individual command values are corrected by the calculated corresponding compensation values, it is possible to reduce possible control errors that might have occurred due to the deflection of the ball screw drive system.

In addition, the present invention may be applied also to a full-closed position control apparatus employing as a position feedback a value obtained based on a real position of the object and a feed position of the servomotor. Namely, according to a fourth aspect of the invention, there is provided a full-closed position control apparatus for controlling the position of an object, which is driven via a ball screw drive system by a servomotor, by feedbacking based on a position command value representing the position of the object and by employing as a position feedback a value based on both a real position of the object and a feed position of the servomotor. Such an apparatus comprises: a speed command value calculation section for calculating a speed command value by differentiating the position command value; an acceleration command value calculation section for calculating an acceleration command value by differentiating the speed command value; a torque command value calculation section for calculating a torque command value, which is a position command value of the servomotor; a motor speed calculation section for calculating a motor speed based on the feed position of the servomotor; a deflection compensation command section for outputting a deflection compensation value, a deflection speed compensation value, and a deflection torque compensation value to compensate a control error due to a possible deflection of the ball screw drive system which may have occurred when the object is driven an adjustable speed based on the position command value, the acceleration command value, the torque command value, and the motor speed; a position deviation calculation section for calculating a position deviation based on the position command value, the deflection compensation value, and the position feedback; a speed deviation calculation section for calculating a speed deviation, based on a value obtained by multiplying the position deviation by a predetermined constant, the speed command value, the deflection speed compensation value, and a speed feedback obtained by differentiating the position feedback; and the torque command value calculation section calculating the torque command value, based on a value obtained by proportioning integrating the speed deviation, a value obtained by multiplying the speed command value by a predetermined constant, and the deflection compensation value.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

The principles of the present invention are particularly useful when applied to a position control apparatus for a ball screw drive system, various preferred embodiments of which will now be described in more detail with reference to the accompanying drawings.

Figure 2:
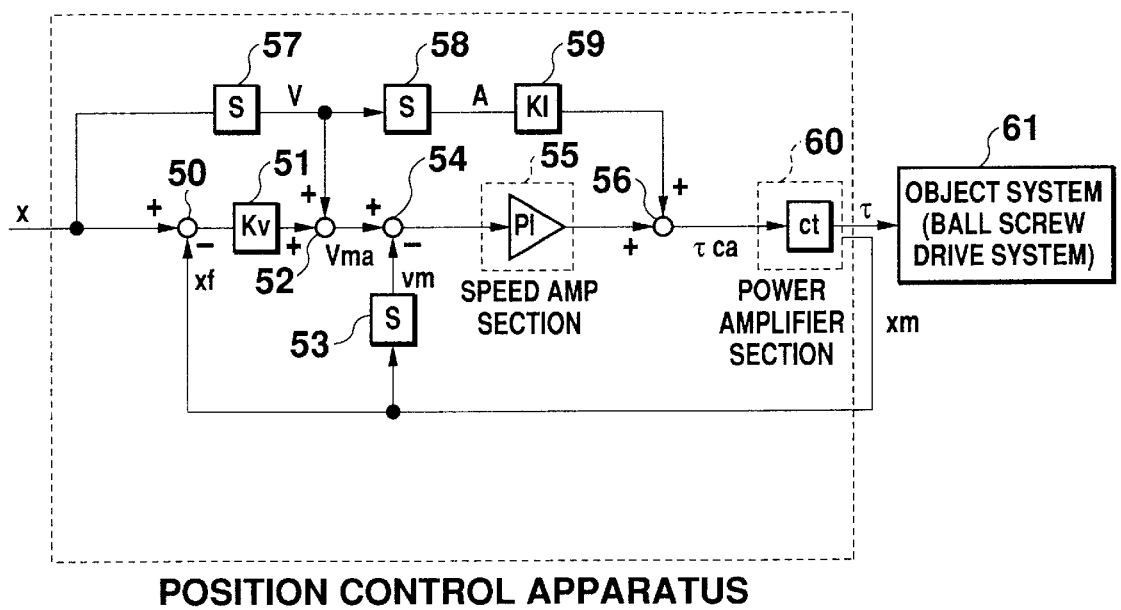
FIG. 2 is a block diagram showing a conventional semi-closed position control apparatus.
Figure 6:
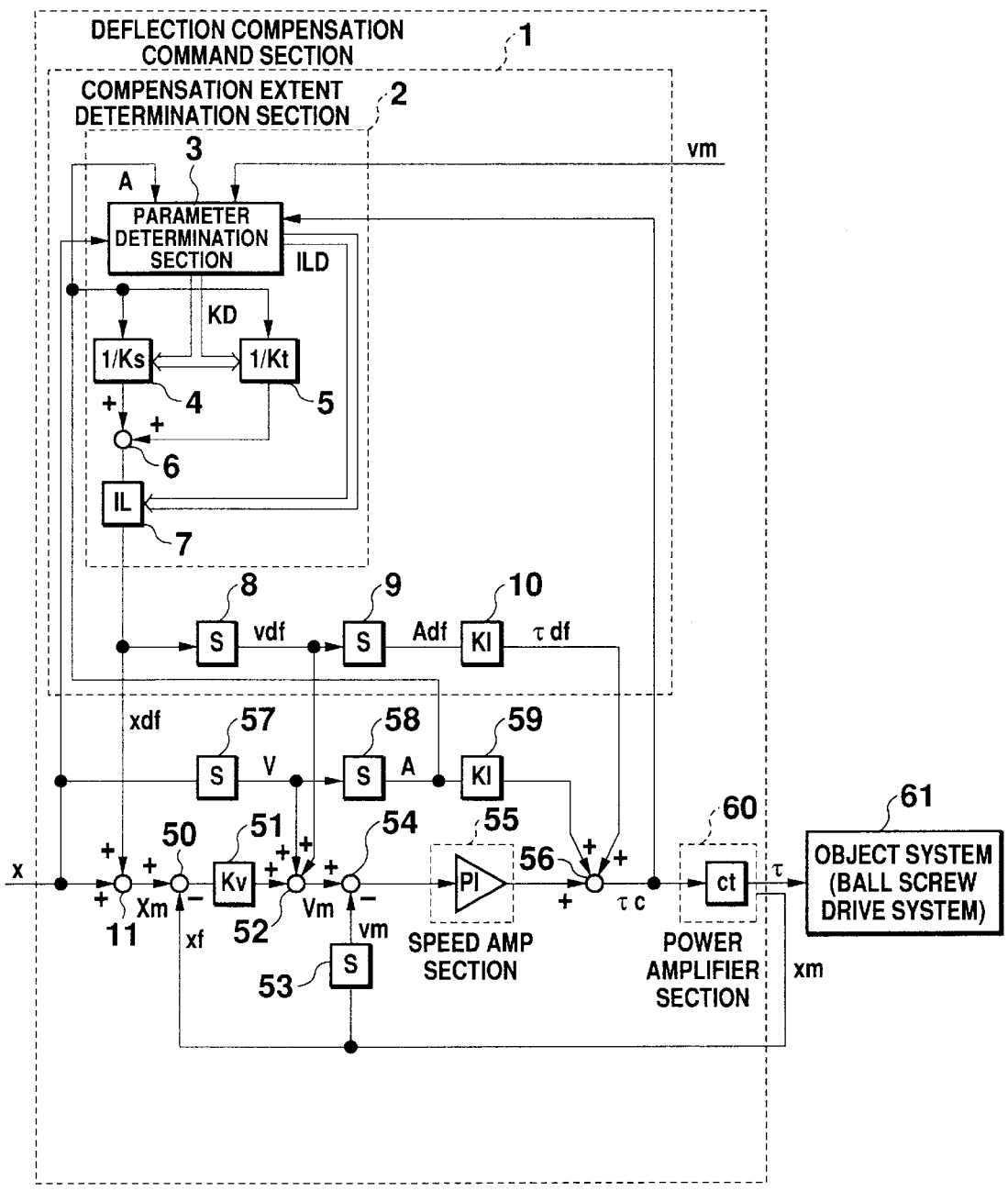
FIG. 6 is a block diagram showing a semi-closed position control apparatus according to a preferred embodiment of the present invention.

FIG. 6 is a block diagram of a semi-closed position control apparatus according to a first embodiment of the present invention. FIG. 6 shows the basic construction corresponding that of the conventional apparatus of FIG. 2; parts or elements similar to those of FIG. 2 are designated by the same reference numbers and labeled with the same names, and their description is not repeated here. The position control apparatus according to the invention is equipped with a deflection compensation command section 1. The deflection compensation command section 1 arithmetically operates a dynamic deflection between a motor position and a table position which occurs when a table is driven at an adjustable speed, based on command information from a below-described host apparatus, control variables of the position control apparatus, and interior parameters of a ball screw drive system as an object system. As a result, a deflection torque compensation value τdf is calculated and output as a torque-command-converted value obtained from: a deflection command value Xdf as a compensation extent to compensate the dynamic deflection, a deflection speed compensation value Vdf as a once-differentiated value of the deflection command value Xdf, and a deflection acceleration compensation value Adf as a once-differentiated value of the deflection speed compensation value Vdf.

A deflection extent or amount (hereinafter called the deflection extent) when the table is driven at an adjustable speed is expressed by the following equation (4) that is obtained from equations (1) and (2) described previously.

$$xm-xi=\{(1/Ks)+(1/Kt)\}\cdot IL\cdot L+\tau d) \quad (4),$$

where τd is a turbulence torque. Since τd acts normally as a onstant value such as a gravitational torque and is much smaller than accelerating/decelerating torque such as a milling torque, its possible influence on the positioning accuracy during adjustable driving is negligibly small. Further, because to control the table position at high precision means to accelerate the table at an acceleration command value A, the deflection command value Xdf is calculated by the following equation (5) obtained from equation (4).

$$Xdf=\{(1/Ks)+(1/Kt)\}\cdot IL\cdot A \quad (5)$$

A compensation extent determination section 2 in the deflection command section 1 executes an arithmetic operation of equation (5) based on interior parameters Ks, Kt, IL, which are determined by a parameter determination section 3 of the ball screw drive system. The acceleration command value A is amplified by an amplifier 4 where a reciprocal number of integrated thrust rigidity Ks multiply and by another amplifier 5 where a reciprocal number of integrated torsional rigidity Kt multiply, and then the respective outputs of these two amplifiers 4, 5 are added in an adder 6. The output of the adder 6 is amplified by an amplifier 7 where the adder's output is multiplied by a load-side inertial moment IL and, as a result, a deflection compensation value Xdf is output. A position command value X serves essentially to command a table position, while a position command corresponding to a position feedback xf=xm serves to command a motor feed position. Consequently, X and Xdf are added in an adder 11 as a deflection-compensated feed position command value Xm equivalent to a motor position command value.

The deflection compensation value Xdf is differentiated by a differentiator 8 as a deflection speed compensation value Vdf. A speed command corresponding to a speed feedback vm should serve to command a motor speed. For this purpose, the deflection speed command value Vdf is added along with the speed command value V and output of an amplifier 51 in an adder 52 as a deflection-compensated speed command value Vm that is equivalent to a motor position command value. The deflection acceleration compensation value Vdf is differentiated by a differentiator 9 as a deflection acceleration compensation value Adf and is then multiplied by a torque command conversion constant K1 by an amplifier 10 as a deflection torque compensation value τdf.

τdf is then added along with an acceleration torque command value K1·A and the output of a speed amplifier section 55 in an adder 56 as a torque command value τc.

Thus, in the present embodiment, in order to obtain a rapid response of the motor feed position equivalent to the deflection compensation value Xdf, a feedforward control is executed on the speed command and the torque command. Widened arrows KD and ILD leading from the parameter determination section 3 to the amplifiers 4, 5 and the amplifier 7 represent the respective setting operations of the interior parameters Ks, Kt, and IL of the ball screw drive system that parameters each serve to determine the amplification factor of each amplifier.

Figure 3:
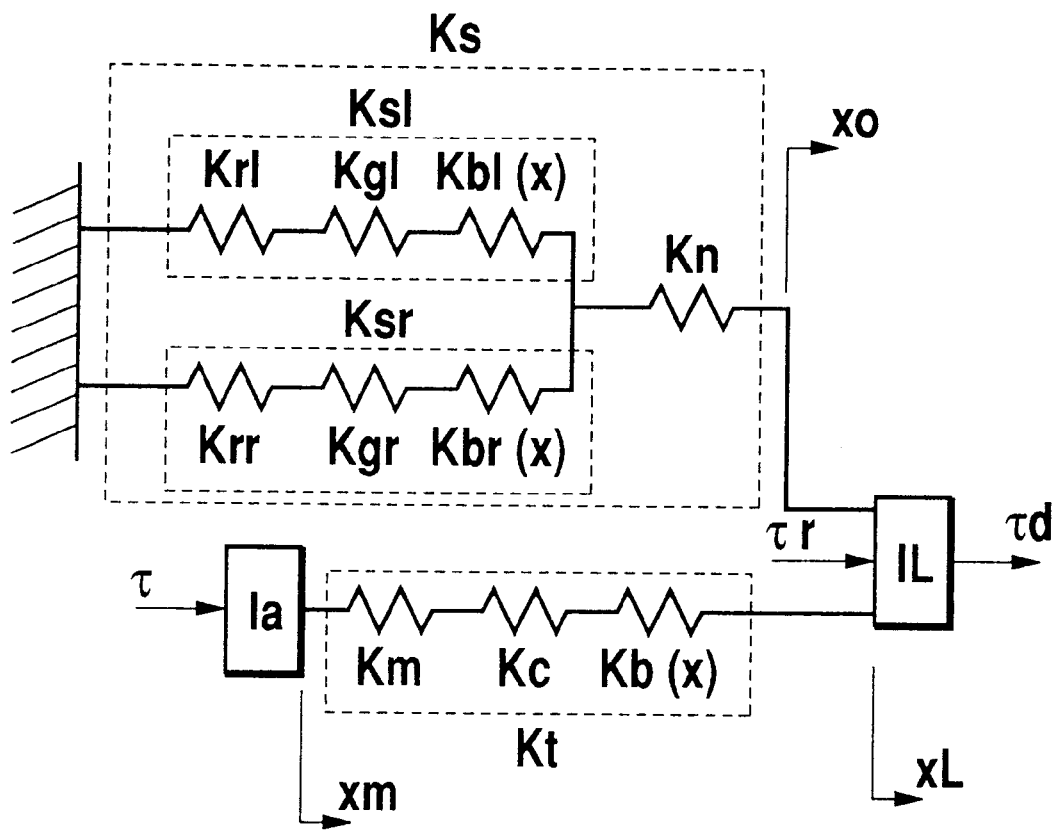
FIG. 3 is a diagram showing a model of the ball screw drive system.
Figure 7:
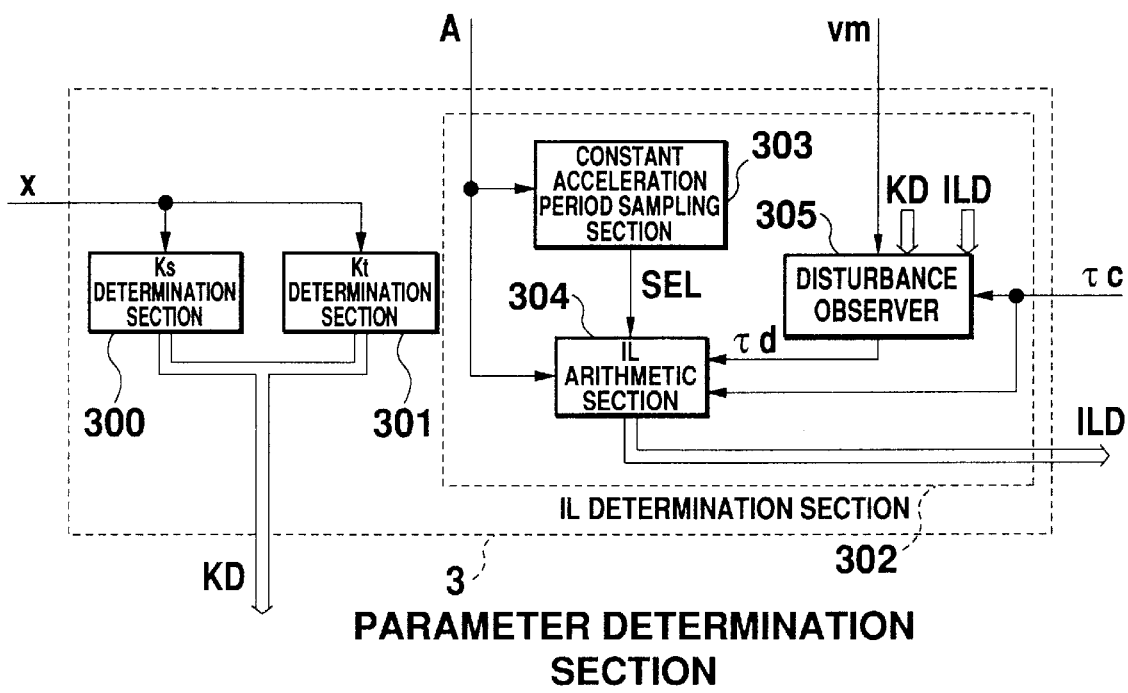
FIG. 7 is a block diagram showing a parameter determination section shown in FIG. 6.

The operation of the parameter determination section 3 will now be described. FIG. 7 is a block diagram showing the interior arrangement of the parameter determination section 3. A Ks determination section 300 and a Kt determination section determine and output an integrated thrust rigidity Ks and an integrated torsional rigidity Kt, respectively, based on the respective position command values X. Because the distance x between the motor-side end of the screw shown in FIG. 1 and the table position represents a table position, x can essentially be substituted for the position command value X. Therefore, as is readily understood from FIG. 3, the integrated thrust rigidity Ks can then be expressed by the following equations (6), (7), (8) using the position command value X.

$$Kbl(x)=(P/2\pi)^2 \cdot (1/n)^2 \cdot \pi \cdot d^2 \cdot E/4X$$

$$Kbr(x)=(P/2\pi)^2 \cdot (1/n)^2 \cdot \pi \cdot d^2 \cdot E/4(L-X) \tag{6}$$

where P is a ball screw lead, d is a screw diameter and E is a Young's modulus.

$$1/Ksl=1/Krl+1/Kgl+1/kbl(x)$$

$$1/Ksr=1/Krrl+1/Kgf+1/kbr(x) \tag{7}$$

If the ball screw is supported at opposite ends, $$1/Ks=\{1/(Ksl+Ksr)\}+(1/Kn)(\text{both ends supporting}) \tag{8}$$

In the foregoing illustrative example, the opposite ends of the ball screw are supported (hereinafter called the both ends supporting) axially so as not to be displaced axially. For an alternative example in which the counter-motor-side end (one end remote from the motor-side end) of the ball screw is not axially supported (hereinafter called the cantilever supporting) so as not to sustain any possible axial strain, equation (8) is substituted by the following equation (9):

$$1/Ks=1/Ksl+1/Kn(\text{cantilever supporting}) \tag{9}$$

Thus, with the parameters (P, n, d, E, L, Krl, Krr, Kgl, Kgr), which are not variable irrespective of the table position, set to their respective starting values (not shown), the Ks determination section 300 executes a succession of arithmetic operations of equations (6), (7), (8), (9) to calculate the integrated thrust rigidity Ks.

In the meantime, the integrated torsional rigidity Kt can be expressed by the following equations (10), (11) using the position command value X.

$$Kb(x)=(1/n)^2 \cdot d^4 \cdot G/32X \tag{10}$$

where G is a modulus of transverse elasticity.

$$1/Kt=1/Km+1/Kc+1/Kb(x) \tag{11}$$

Thus, with the parameters n, d, G, Km, Kc, which are not variable irrespective of the table position, set to their respective starting values (not shown), the Kt determination section 301 executes a succession of arithmetic operations of equations (10), (11) from the position command value X to calculate an integrated torsional rigidity Kt.

Figure 1:
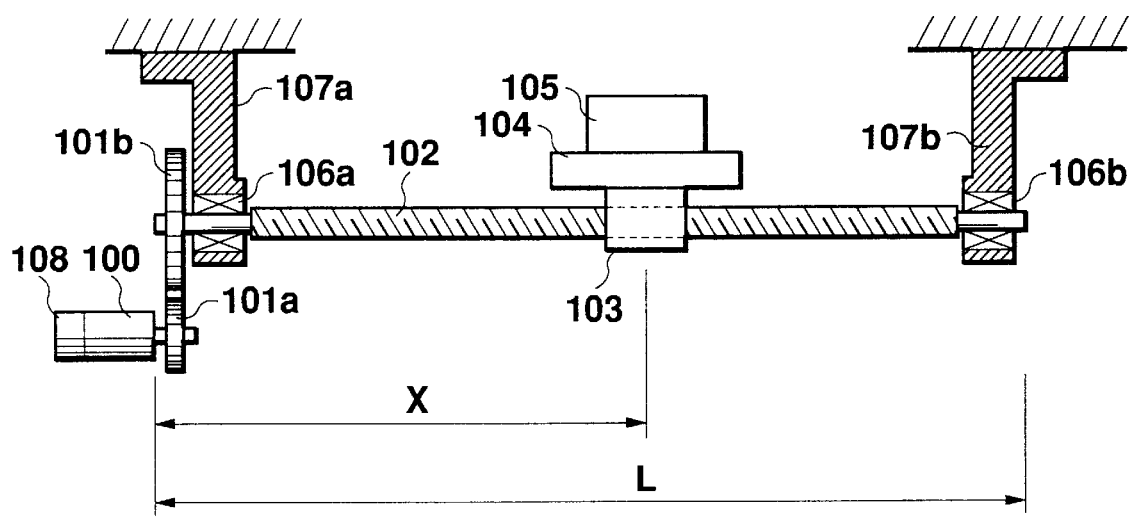
FIG. 1 is a diagram of a general mechanism of a ball screw drive system, showing only members associated with one axis.
Figure 8:
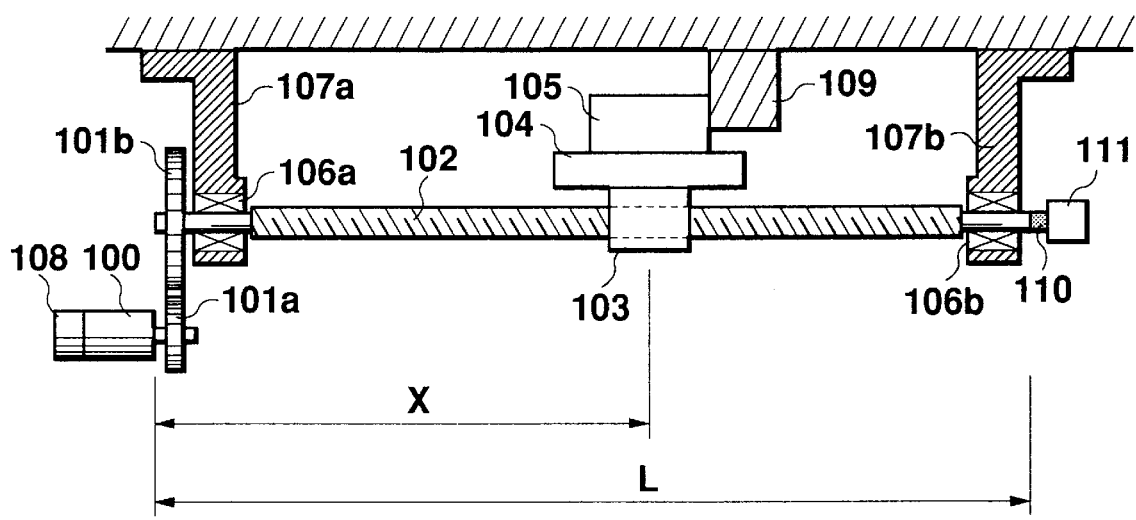
FIG. 8 is a diagram similar to FIG. 1, but showing the operation of Ks and Kt determination sections shown in FIG. 7.

FIG. 8 is a diagram showing an alternative arrangement according to a second embodiment in which the Ks determination section 300 and the Kt determination section 301 act in a different manner than in the first embodiment. In FIG. 8, parts or elements similar to those of FIG. 1 are designated by the same reference numbers and alphanumeric characters and labeled, with the same names, and their description is not repeated here. An anchoring member 109 is rigidly connected to an immovable machine frame and may therefore be regarded as a totally rigid like the machine frame. A rotary encoder 111 is attached to the counter-motor-side end of a screw portion 102 via a coupling 110. Now assuming that an output torque τ, such as to move the table away from a motor 100, is caused in the motor 100 while the motor 100 is in rotation, the motor 100 and the table 104 will become unable to rotate or move. This status can be expressed by the following equations (12), (13), (14) that are obtained from the above equations (1), (2), (3) by using a motor output torque τ.

$$\tau=\tau r=\tau d \tag{12}$$

$$xm-xL=(1/Kt)\tau \tag{13}$$

$$xm-xi=(1/Ks+1/Kt)\tau \tag{14}$$

xm−xL can be detected as a difference between an extent of variation of a motor position xm as observed around the occurrence of the output torque τ and an extent of variation of the rotary encoder 111. Namely, an integrated torsional rigidity Kt at a position from the starting position by the distance x can be calculated from the output torque τ and equation (13). xm−xi can be detected as an extent of variation of the motor feed position xm as observed around the occurrence of the output torque τ, so an integrated thrust rigidity Ks at a point away from the starting point by the distance x can be calculated from the integrated torsional rigidity Kt, equation (14) and the output torque τ.

By executing this succession of rigidity measuring operations at a plurality of points in the table moving range while the anchoring member 109 is moved on the machine frame, an integrated thrust rigidity Ks and the integrated torsional rigidity Kt can be calculated for each of a plurality of points with respect to the distance x. Regarding the Ks determination section 300 and the Kt determination section 301, various values of each of an integrated thrust rigidity Ks and an integrated torsional rigidity Kt may be preset for each of plural points with respect to the distance x. In such event, the Ks determination section 300 and the Kt determination section 301 calculate an integrated thrust rigidity Ks and an integrated torsional rigidity Kt with respect to a position command value X by linear interpolation, as expressed by the following equations (5) using Ks1 and Kt1 at an intermediate position X1(X1≦X) when the table approaches the motor-side end of the ball screw in the axial direction and Ks2 and Kt2 at an intermediate position X2 (X2≧X) when the table approaches when the table approaches the counter-motor-side end of the ball screw.

$$Ks=Ks1+(Ks2-Ks1)\cdot\{(X-X1)/(X2-X1)\}$$

$$Kt=Kt1+(Kt2-Kt1)\cdot\{(X-X1)/(X2-X1)\} \tag{15}$$

Further, in the foregoing example, instead of the distance x from the motor-side end of the screw to the table position, the position command value X is employed. However, because the possible influence of a position deviation extent on the variation of rigidity during adjustable driving resulting from a delay of position response and a deflection of the drive system is negligibly small, the motor feed position xm and the detectable real position xi of the table may be substituted for the position command value X.

Returning back to FIG. 7, the action of the IL determination section 302 will now be described. The constant-acceleration period choosing section 303 outputs, upon receipt of the acceleration command value A as the input, a binary signal SEL in which each allowable position has one of two possible states OFF and ON. OFF and ON respectively indicate the constant-acceleration period and the non-constant-acceleration period. The turbulence observer 305 estimates a turbulence torque τd, which is designed based on the conventional observer theory, from a motor speed vm as an output of the object system side and a torque command valueτ as the input of the objective system side with a ball screw drive system being employed as the object system. For the interior parameters of the turbulence observer 305, Kt and IL as identified respectively by the Kt determination section 301 and the IL determination section 302 are used. The IL arithmetic section 304 carries out an arithmetic operation of a load-side inertial moment IL from the acceleration command value A and the turbulence torque τd, which is to be outputted from the turbulence observer 305, and the torque command value τc, and outputs the load-side inertial moment IL.

The manner in which the position control system of FIG. 6 is operated while the table is driven at a constant-acceleration adjustable speed will now be described.

The motor output torque τ is expressed by the following equation (16) using equation (1).

$$\tau=Ia\cdot am+\tau r=Ia\cdot am+IL\cdot aL+\tau d \tag{16}$$

where am is a motor acceleration.

Since τd varies by only a negligibly small extent with time, am and aL may be treated as equal to each other while the table is driven at a constant-acceleration ajustable speed. This can be explained from the following quantitative phenomenon. For example, under the condition that the acceleration A (A>0) is constant, if am>aL, the deflection increases and τr also increases, thus causing aL to increase. To the contrary, if am<aL, the deflection decreases and τr also decreases, thus causing aL to decrease.

Therefore, under the condition that the table is driven at a constant-acceleration adjustable speed, equation (16) can be expressed alternatively by the following equation (17):

$$\tau=(Ia+IL)\cdot am+\tau d \tag{17}$$

Namely, under the condition that the table is driven at a constant-acceleration adjustable speed, partly since the deflection does not vary and partly since the motor output torque τ also may be constant, the operation of the position control apparatus will be approximately normal. For example, the output of the amplifier 51 will be ideally 0 by a feedforward control so that with respect to the deflection-compensated speed command value Vm, the following equation (18) is established:

$$Vm=V+Vdf=vm \tag{18}$$

Figure 9:
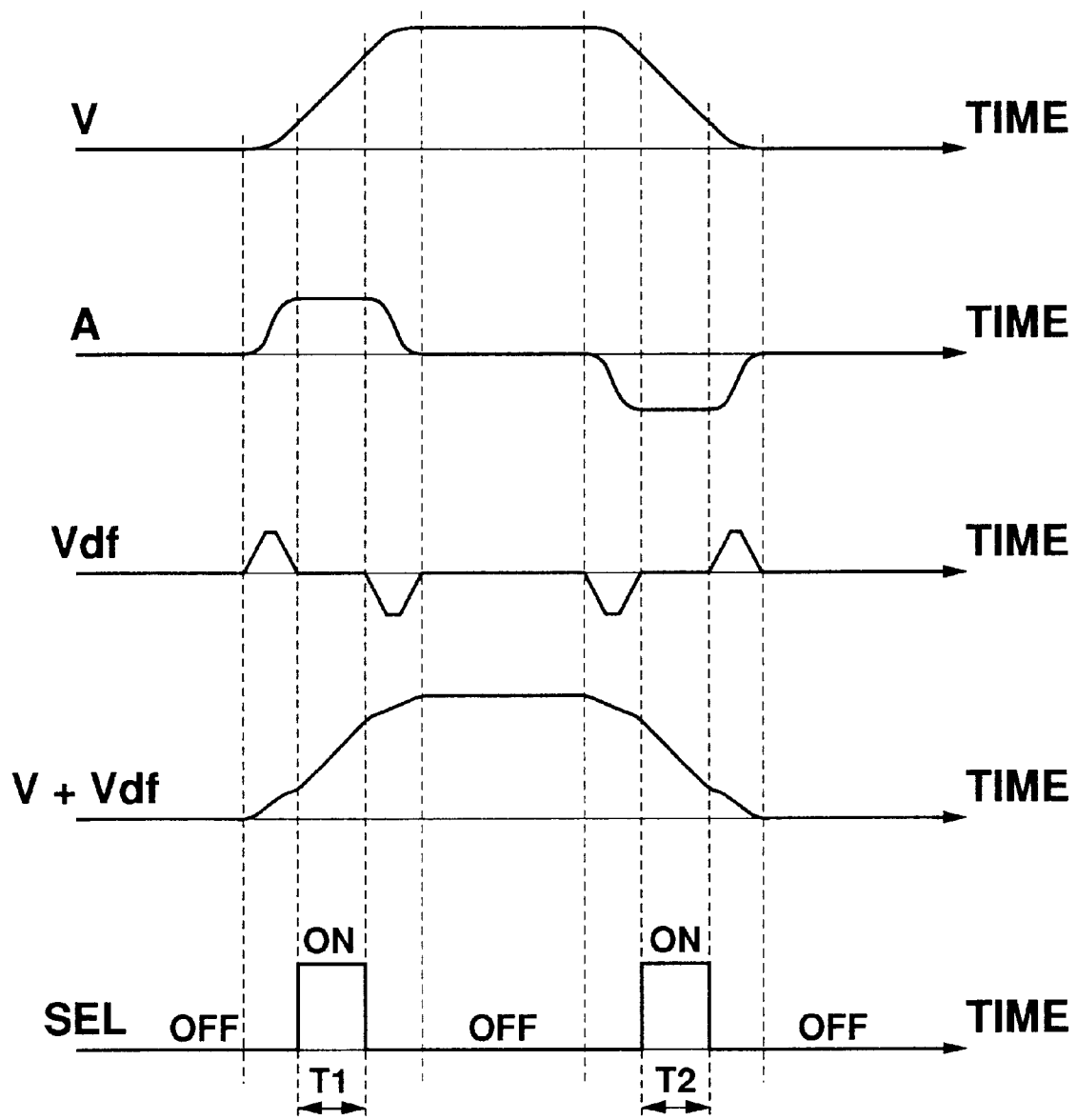
FIG. 9 is a timing chart showing the operation of a constant-acceleration period shown in FIG. 7.

Returning back to FIG. 7, the operation of the IL determination section 302 will be described further. FIG. 9 is a timing chart for explaining the operation of the constant-acceleration period choosing section 303, showing, from top, the speed command value V and the acceleration command value A, which are commanded from a host apparatus. The deflection speed compensation value Vdf, third from top, is a differentiated value of the deflection compensation value Xdf as mentioned above; since Xdf is proportional to the acceleration command value A as seen from equation 5, Vdf is the differential of the acceleration command value A. Therefore, Vdf of the constant-acceleration periods T1 and T2, which are each represented by a binary signal SEL as the output of the constant-acceleration period choosing section 303, of the acceleration command value A will be 0 so that the constant-acceleration period of the acceleration command value A will be equal to the acceleration during the constant-acceleration period and constant-acceleration period (V+Vdf). In addition, it is understood from equation (18) that the acceleration command value A and the motor acceleration am satisfy the following equation (19) within the constant-acceleration period of the acceleration command value A.

$$A=am \tag{19}$$

Hence, the constant-acceleration period choosing section 303 determines the ON/OFF condition of a two binary signal SEL with respect to the acceleration command value A from the following equations (20) and outputs the determined ON/OFF condition.

$(dA/dt=0)\cap(A\ 0)=1$:ON condition $$(dA/dt=0)\cap(A\ 0)=0\text{:OFF condition} \tag{20}$$

The IL arithmetic section 304 carries out an arithmetic operation of the load-side inertial moment IL from the turbulence torque τd, which is output from the turbulence observer 305, and the torque command value τc according to the following equation (21) obtained from equations (17) and (19) and then outputs the obtained load-side inertial moment IL.

$$(Ia+IL)=(\tau-\tau d)/A=(\tau c\cdot Ct-\tau d)/A \tag{21}$$

In the foregoing operation of the parameter determination section 3, the acceleration command value A employed in the IL determination section 302 may be substituted by the motor acceleration am, which is the differential of the motor speed vm. Further, since the axial deflection also does not vary and is constant during the constant-acceleration period, $$A=am=ai \tag{22}$$

where ai is a table acceleration, which is a twice-differential value of the real position xi of the table. As a consequence, the table acceleration ai may be employed.

Thus, according to this position control apparatus, it is possible to identify the integrated thrust rigidity Ks and integrated torsion rigidity Kt, which vary according to the table position, and the load-side initial moment, which varies according to the work weight, with real time by the parameter determination section 3. Further, It is possible to calculate a dynamic deflection extent which occurs between the motor and the table when the latter is driven at an adjustable speed based on its occurring mechanism and outputs its same extent with real time as the deflection compensation value Xdf.

Originally, the position command value X representing a table position command essentially represents a motor position command in the semi-closed position control apparatus. Therefore, by adding the deflection value Xdf to the position command value X, it is possible to create a deflection-compensated feed position command value Xm with respect to the motor which value Xm includes the dynamic deflection extent when the table is driven at an adjustable speed. The motor feed position xm thereby moves so as to coincide with the deflection-compensated feed position command value Xm and, as a result, the real table position xi moves so as to coincide with the original position command value X.

In addition, since the deflection compensation command section 1 calculates and outputs a deflection speed compensation value Vdf, which is the differential of the deflection compensation value Xdf, and a deflection torque compensation value τdf, which is processed with an arithmetic operation on the differential of the deflection speed compensation value Vdf, the position control apparatus can secure a much quicker response of the motor position corresponding to the deflection compensation value Xdf by feedforward of Vdf and τdf.

Figure 4:
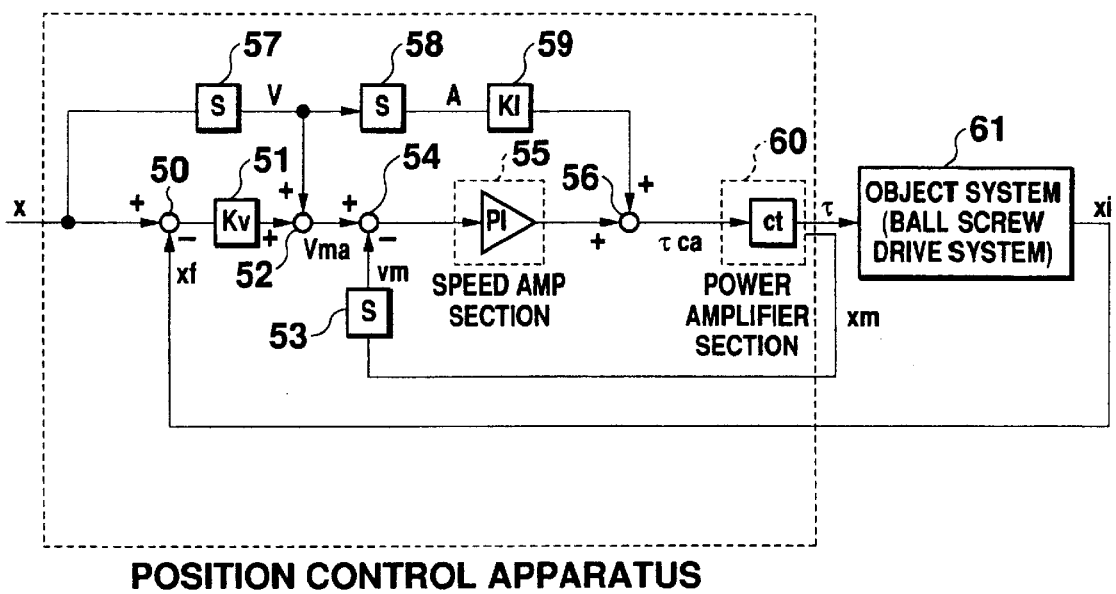
FIG. 4 is a block diagram showing a conventional full-closed position control apparatus
Figure 5:
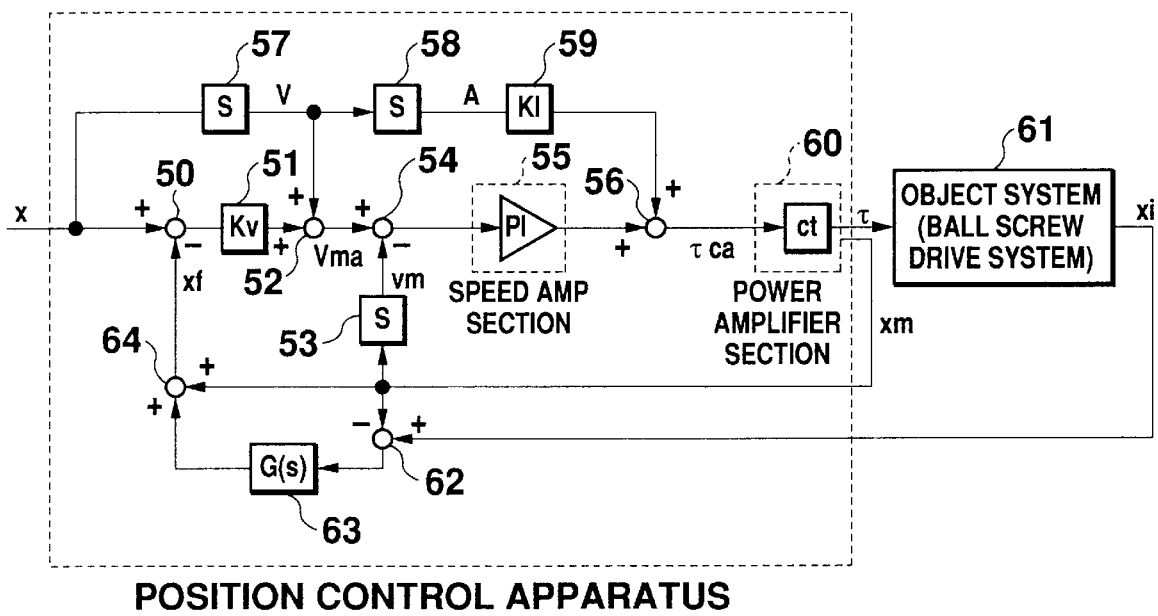
FIG. 5 is a block diagram showing another conventional full-closed position control apparatus using a composite position feedback.
Figure 10:
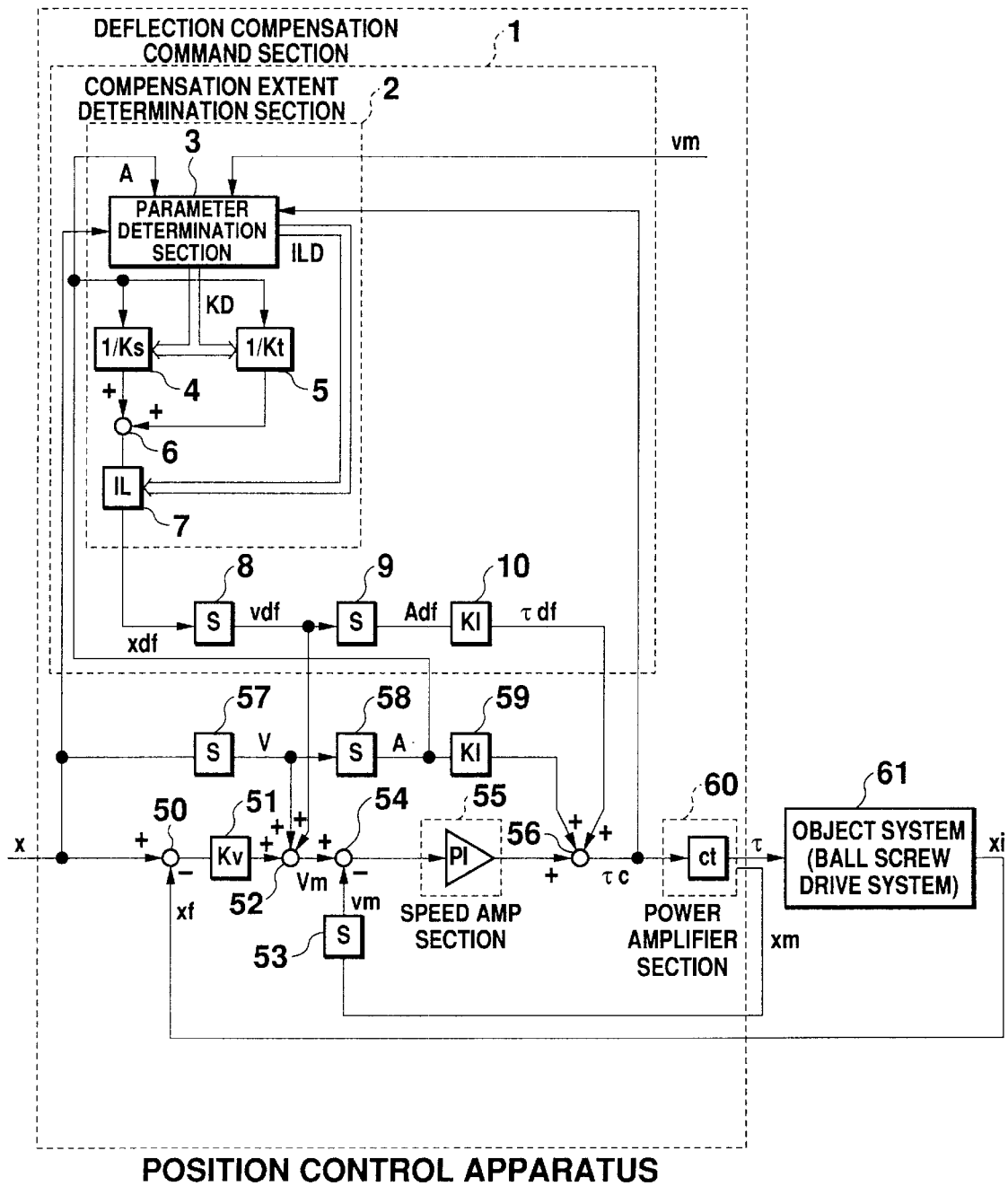
FIG. 10 is a block diagram showing a full-closed position control apparatus according to another preferred embodiment of the present invention.

FIG. 10 is a block diagram showing a full-closed position control apparatus according to a third embodiment of the invention, corresponding to FIG. 4 and the block diagram of FIG. 1 as well. In FIG. 10, parts or elements similar to those of FIGS. 1 and 4 are designated by the same reference numbers and labeled with the same names, and their description is not repeated here. In the full-closed position control apparatus, since the position feedback xf is regarded as the real table position xi, the position command value X essentially represents a table position command. Consequently, for the full-closed position control apparatus, the deflection speed compensation value Vdf is added directly to a speed command, which essentially represents a speed command with respect to the motor speed, without compensating the position command value X to thereby creates a deflection-compensated speed command value Vm. Further, in order for a much quicker response of the motor speed vm including the deflection speed, the feedforward of the torque compensation value τdf takes place at the stage of the torque command.

Figure 11:
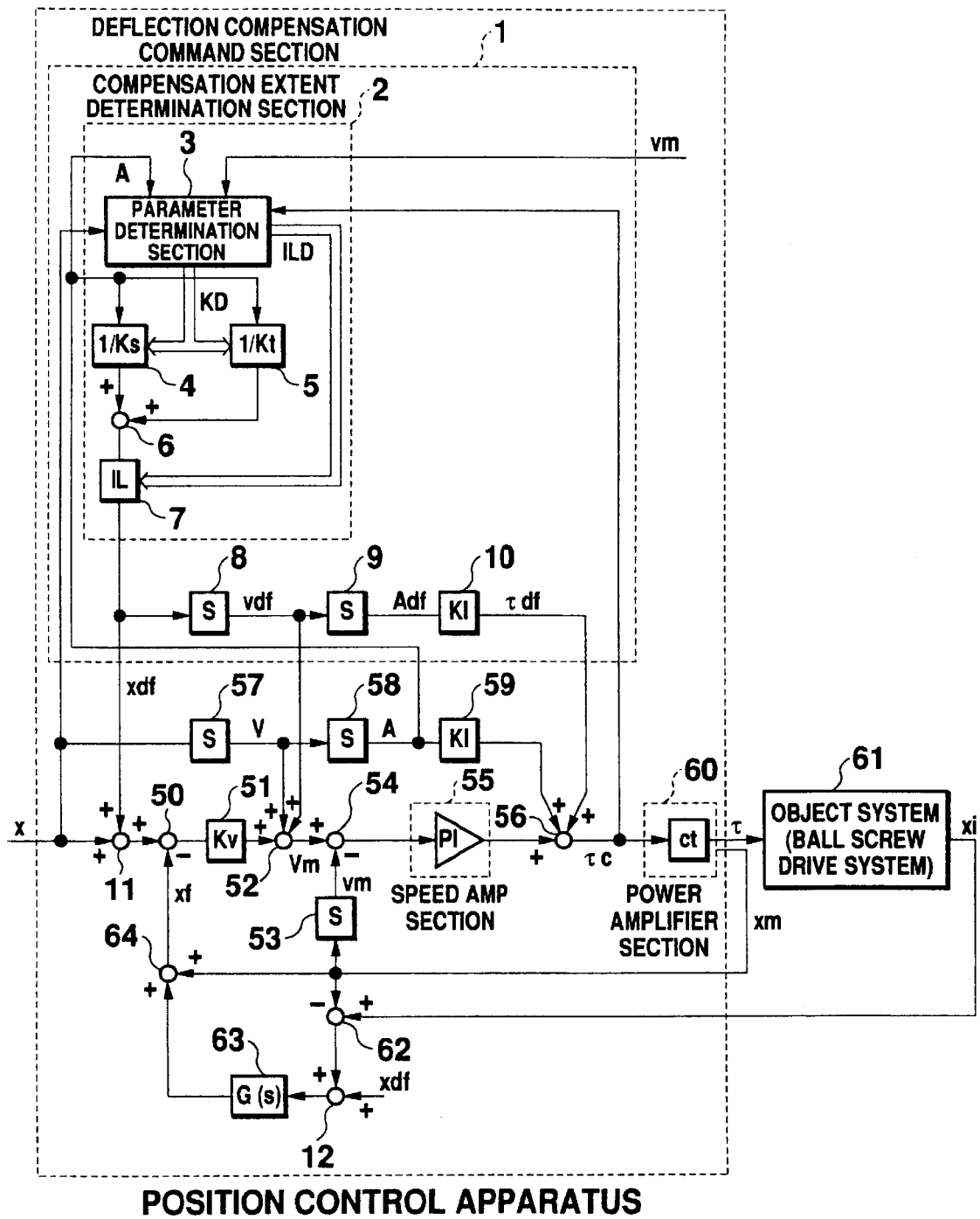
FIG. 11 is a block diagram showing another full-closed position control apparatus using a composite position feedback according to still another preferred embodiment of the present invention.

FIG. 11 is a block diagram showing a full-closed position control apparatus using a composite position feedback according to a fourth embodiment of the invention. In FIG. 11, parts or elements similar to those of the above-described conventional apparatus and the foregoing embodiments are merely designated by the same reference numbers and labeled with the same names, and their description is omitted here. In this embodiment, unlike the third embodiment of FIG. 10, the deflection compensation value Xdf is added to the position command value X. Further, the deflection compensation value Xdf is a, added, by an adder 12, to a subtraction value (xi−xm) output from a subtracter 62 where the motor feed position xm is from the real table position xi, and the resulting value is input to a function unit 63.

With this construction, as described above, since the deflection compensation value Xdf is added to a high-frequency position command value X such that the motor feed position xm is feedbacked as a position feedback xf≈xm, a deflection-compensated position command value Xm becomes $$Xm = X + Xdf = xf \approx xm \tag{23}$$

if the position control takes place in an ideal manner, and as a result, the motor position xm moves so as to coincide with the deflection-compensated position command value Xm. Regarding a low-frequency position command value X taking on G(s)≈1, the reflection-compensated position command value Xm becomes $$Xm = X + Xdf = xf \approx xm + (xi - xm) + Xdf = xi + Xdf \tag{24}$$

namely, X=xi if the position control takes place in an ideal manner, and as a result, it is regularly possible to control the table position directly, thereby realizing a high-speed response, which includes a deflection compensation component, of the motor without harming the intended objective of the full-closed position control apparatus using the above-described conventional composite position feedback.

According to the foregoing embodiments, by executing deflection compensation in agreement with the individual control content at the stage of position command, speed command and torque command for the semi-closed position control apparatus, the full-closed position control apparatus, or the full-closed position control apparatus using a composite position feedback, it is possible to realize a high-speed response of the motor which includes the compensation component of a possible dynamic deflection occurred during adjustable driving, without harming the individual intended objectives of these position control apparatuses. As a result, even during adjustable driving, it is possible to control the table position much more precisely in accordance with the position command value.

As is apparent from the foregoing disclosure, in position control for a ball screw drive system driving a table via a ball screw, regarding a dynamic deflection, which occurs during adjustable driving as a position deviation of the motor and table positions due to the integrated torsional rigidity existing between the motor and the table, it is possible to identify an integrated thrust rigidity Ks and an integrated torsional rigidity Kt, which vary according to the table position, and a load-side inertial moment, which varies according to the work weight, with real time. In short, during adjustable driving, a possible dynamic deflection extent is calculated based on its occurring mechanism, and its equivalent extent is outputted with real time as a deflection compensation extent.

In addition, for the semi-closed position control apparatus, the full-closed position control apparatus or the full-closed position control apparatus using a composition position feedback, by executing deflection compensation in agreement with the individual control content at the stage of position command, speed command and torque command, it is possible to achieve a high-speed response of the motor, which includes the compensation component of a dynamic deflection, without harming the respective control objectives of these position control apparatuses. Accordingly, it is possible to realize high-precision control of the table position during adjustable driving, which would have been impossible or extremely difficult with the conventional position control apparatus.

It is also apparent that the present invention is not limited to the illustrated embodiments and that various modifications and changes may be suggested without departing from the scope and spirit of the invention.

What is claimed is:

1. A position control apparatus for controlling the position of an object, which is driven via a ball screw drive system by a servomotor, based on a predetermined command, said apparatus having a deflection compensation command section for outputting at least one of the following values:

a deflection compensation value, a deflection speed compensation value, and a torque compensation value;

for compensating a control error due to a possible deflection of a ball screw drive system, said at least one compensation value being calculated based on:

a position command value, an acceleration command value, and a torque command value, wherein said deflection compensation command section is equipped with a compensation extent determination section including (a) parameter determination section having:
      1) an integrated thrust rigidity determination section for calculating an integrated thrust rigidity of the ball screw drive system based on said position command value,
      2) an integrated torsional rigidity determination section for calculating an integrated torsional rigidity of the ball screw drive system based on said position command value,
      3) a load-side inertial moment determination section for calculating a current load-side inertial moment based on said acceleration command value, said torque command value the current motor speed, said integrated thrust rigidity, said integrated torsional rigidity and a load-side inertial moment in previous cycle;
   (b) a first amplifier for multiplying said acceleration command value by a reciprocal number of said integrated thrust rigidity calculated by said parameter determination section;
   (c) a second amplifier for multiplying said acceleration command value by a reciprocal number of said integrated torsional rigidity calculated by said parameter determination section;
   (d) an adder for obtaining a combined output of said first and second amplifiers; and
   (e) a third amplifier for calculating a deflection extent by multiplying the output of said adder by said load-side inertial moment calculated by said parameter determination section.

2. A position control apparatus according to claim 1, wherein said load-side inertial moment determination section includes:

a constant acceleration period choosing section for choosing a constant acceleration period based on said acceleration command value;

a turbulence observer for calculating a turbulence torque based on said integrated thrust rigidity, said integrated torsional rigidity, the motor speed, said torque command value and said previous load-side inertial moment calculated in said previous control cycle; and an inertial moment arithmetic section for calculating a load-side inertial moment in said chosen constant-acceleration period based on said acceleration command value, said turbulence torque and said torque command value.

3. A position control apparatus according to claim 2, wherein said deflection compensation command section includes:

a deflection acceleration compensation value calculation section for calculating a deflection acceleration compensation value by differentiating said deflection speed compensation value; and a torque compensation value calculation section for calculating a torque compensation value by differentiating said deflection speed compensation value and then multiplying the resulting differentiated value by a predetermined constant.

4. A semi-closed position control apparatus for controlling the position of an object, which is driven via a ball screw drive system by a servomotor, by feedbacking based on a position command value representing the position of the object and by substituting a feed position of the servomotor for the position of the object as a position feedback, said apparatus comprising:

(a) a speed command value calculation section for calculating a speed command value by differentiating the position command value;

(b) an acceleration command value calculation section for calculating an acceleration command value by differentiating said speed command value;

(c) a torque command value calculation section for calculating a torque command value, which is a position command value of the servomotor;

(d) a motor speed calculation section for calculating a motor speed based on the feed position of the servomotor;

(e) a deflection compensation command section for outputting a deflection compensation value, a deflection speed compensation value and a deflection torque compensation value to compensate a control error due to a possible deflection of the ball screw drive system, which deflection occurred when the object is driven an adjustable speed, based on said position command value, said acceleration command value, said torque command value and the motor speed;

(f) a position deviation calculation section for calculating a position deviation based on said position command value, said deflection compensation value and said position feedback;

(g) a speed deviation calculation section for calculating a speed deviation based on a value obtained by multiplying said position deviation by a predetermined constant, said speed command value, said deflection speed compensation value and a speed feedback obtained by differentiating said position feedback; and (h) wherein the torque command value calculation section calculates a torque command value based on a value obtained by proportioning and integrating said speed deviation, a value obtained by multiplying said speed command value by a predetermined constant and said deflection compensation value.

5. A position control apparatus according to claim 4, wherein said deflection compensation command section is equipped with a compensation extent determination section including:

(a) a parameter determination section having
      (1) an integrated thrust rigidity determination section for calculating an integrated thrust rigidity of the ball screw drive system based on said position command value, 2) an integrated torsional rigidity determination section for calculating an integrated torsional rigidity of the ball screw drive system based on said position command value, and 3) a load-side inertial moment determination section for calculating a current load-side inertial moment based on said acceleration command value, said torque command value, the current motor speed, said integrated thrust rigidity, said integrated torsional rigidity and a load-side inertial moment in previous control cycle;

(b) a first amplifier for multiplying said acceleration command value by a reciprocal number of said integrated thrust rigidity calculated by said parameter determination section;

(c) a second amplifier for multiplying said acceleration command value by a reciprocal number of said integrated torsional rigidity calculated by said parameter determination section;

(d) an adder for obtaining a combined output of said first and second amplifiers; and (e) a third amplifier for calculating a deflection extent by multiplying the output of said adder by said load-side inertial moment calculated by said parameter determination section.

6. A position control apparatus according to claim 5, wherein said load-side inertial moment determination section includes:

a constant acceleration period choosing section for choosing a constant acceleration period based on said acceleration command value;

a turbulence observer for calculating a turbulence torque based on said integrated thrust rigidity, said integrated torsional rigidity, the motor speed, said torque command value and said previous load-side inertial moment calculated in said previous control cycle; and an inertial moment arithmetic section for calculating a load-side inertial moment in said chosen constant-acceleration period based on said acceleration command value, said turbulence torque and said torque command value.

7. A position control apparatus according to claim 6, wherein said deflection compensation command section includes:

a deflection acceleration compensation value calculation section for calculating a deflection acceleration compensation value by differentiating said deflection speed compensation value; and a torque compensation value calculation section for calculating a torque compensation value by differentiating said deflection speed compensation value and then multiplying the resulting differentiated value by a predetermined constant.

8. A full-closed position control apparatus for controlling the position of an object, which is driven via a ball screw drive system by a servomotor, by feedbacking based on a position command value representing the position of the object and by employing a real position of the object as a position feedback, said apparatus comprising:

(a) a speed command value calculation section for calculating a speed command value by differentiating the position command value;

(b) an acceleration command value calculation section for calculating an acceleration command value by differentiating said speed command value;

(c) a torque command value calculation section for calculating a torque command value, which is a position command value of the servomotor;

(d) a motor speed calculation section for calculating a motor speed based on the feed position of the servomotor;

(e) a deflection compensation command section for outputting a deflection speed compensation value and a deflection torque compensation value to compensate a control error due to a possible deflection of the ball screw drive system, based on said position command value, said acceleration command value, said torque command value and the motor speed;

(f) a position deviation calculation section for calculating a position deviation based on said position command value and said position feedback;

(g) a speed deviation calculation section for calculating a speed deviation based on a value obtained by multiplying said position deviation by a predetermined constant, said speed command value, said deflection speed compensation value and a speed feedback obtained by differentiating said position feedback;

(h) wherein the torque command value calculation section calculates a torque command value based on a value obtained by proportioning and integrating said speed command value by a predetermined constant and said deflection compensation value.

9. A position control apparatus according to claim 8, wherein said deflection compensation command section is equipped with a compensation extent determination section including:

(a) a parameter determination section having
(1) an integrated thrust rigidity determination section for calculating an integrated thrust rigidity of the ball screw drive system based on said position command value, 2) an integrated torsional rigidity determination section for calculating an integrated torsional rigidity of the ball screw drive system based on said position command value, and 3) a load-side inertial moment determination section for calculating a current load-side inertial moment based on said acceleration command value, said torque command value, the current motor speed, said integrated thrust rigidity, said integrated torsional rigidity and a load-side inertial moment in previous control cycle;

(b) a first amplifier for multiplying said acceleration command value by a reciprocal number of said integrated thrust rigidity calculated by said parameter determination section;

(c) a second amplifier for multiplying said acceleration command value by a reciprocal number of said integrated torsional rigidity calculated by said parameter determination section;

(d) an adder for obtaining a combined output of said first and second amplifiers; and (e) a third amplifier for calculating a deflection extent by multiplying the output of said adder by said load-side inertial moment calculated by said parameter determination section.

10. A position control apparatus according to claim 9, wherein said load-side inertial moment determination section includes:

a constant acceleration period choosing section for choosing a constant acceleration period based on said acceleration command value;

a turbulence observer for calculating a turbulence torque based on said integrated thrust rigidity, said integrated torsional rigidity, the motor speed, said torque command value and said previous load-side inertial moment calculated in said previous control cycle; and an inertial moment arithmetic section for calculating a load-side inertial moment in said chosen constant-acceleration period based on said acceleration command value, said turbulence torque and said torque command value.

11. A position control apparatus according to claim 10, wherein said deflection compensation command section includes:

a deflection acceleration compensation value calculation section for calculating a deflection acceleration compensation value by differentiating said deflection acceleration speed compensation value; and a torque compensation value calculation section for calculating a torque compensation value by differentiating said deflection speed compensation value and then multiplying the resulting differentiated value by a predetermined constant.

12. A full-closed position control apparatus for controlling the position of an object, which is driven via a ball screw drive system by a servomotor, by feedbacking based on a position command value representing the position of the object and by employing as a position feedback a value based on both a real position of the object and a feed position of the servomotor, said apparatus comprising:

(a) a speed command value calculation section for calculating a speed command value by differentiating the position command value;

(b) an acceleration command value calculation section for calculating an acceleration command value by differentiating said speed command value;

(c) a torque command value calculation section for calculating a torque command value, which is a position command value of the servomotor;

(d) a motor speed calculation section for calculating a motor speed based on the feed position of the servomotor;

(e) a deflection compensation command section for outputting a deflection compensation value, a deflection speed compensation value and a deflection torque compensation value to compensate a control error due to a possible deflection of the ball screw drive system based on said position command value, said acceleration command value, said torque command value and the motor speed;

(f) a position deviation calculation section for calculating a position deviation based on said position command value, said deflection compensation value and said position feedback;

(g) a speed deviation calculation section for calculating a speed deviation, based on a value obtained by multiplying said position deviation by a predetermined constant, said speed command value, said deflection speed compensation value and a speed feedback obtained by differentiating said position feedback;

(h) wherein the torque command value calculation section calculates a torque command value based on a value obtained by proportioning and integrating said speed deviation, a value obtained by multiplying said speed command value by a predetermined constant and said deflection compensation value.

13. A position control apparatus according to claim 12, wherein said deflection compensation command section is equipped with a compensation extent determination section including:

(d) a parameter determination section having
(1) an integrated thrust rigidity determination section for calculating an integrated thrust rigidity of the ball screw drive system based on said position command value,
2) an integrated torsional rigidity determination section for calculating an integrated torsional rigidity of the ball screw drive system based on said position command value, and
3) a load-side inertial moment determination section for calculating a current load-side inertial moment based on said acceleration command value, said torque command value, the current motor speed, said integrated thrust rigidity, said integrated torsional rigidity and a load-side inertial moment in previous control cycle;

(b) a first amplifier for multiplying said acceleration command value by a reciprocal number of said integrated thrust rigidity calculated by said parameter determination section;

(c) a second amplifier for multiplying said acceleration command value by a reciprocal number of said integrated torsional rigidity calculated by said parameter determination section;

(d) an adder for obtaining a combined output of said first and second amplifiers; and (e) a third amplifier for calculating a deflection extent by multiplying the output of said adder by said load-side inertial moment calculated by said parameter determination section.

14. A position control apparatus according to claim 13, wherein said load-side inertial moment determination section includes:

a constant acceleration period choosing section for choosing a constant acceleration period based on said acceleration command value;

a turbulence observer for calculating a turbulence torque based on said integrated thrust rigidity, said integrated torsional rigidity, the motor speed, said torque command value and said previous load-side inertial moment calculated in said previous control cycle; and an inertial moment arithmetic section for calculating a load-side inertial moment in said chosen constant-acceleration period based on said acceleration command value, said turbulence torque and said torque command value.

15. A position control apparatus according to claim 14, wherein said deflection compensation command section includes:

a deflection acceleration compensation value calculation section for calculating a deflection acceleration compensation value by differentiating said deflection speed compensation value; and a torque compensation value calculation section for calculating a torque compensation value by differentiating said deflection speed compensation value and then multiplying the resulting differentiated value by a predetermined constant.

16. A position control apparatus for controlling the position of an object, which is driven via a ball screw drive system by a servomotor, based on a predetermined command, said apparatus having a deflection compensation command section for outputting at least one of:

a deflection position compensation value,
a deflection speed compensation value, and
a deflection torque compensation value;

for compensation a control error due to a possible deflection of the ball screw drive system, said at least one compensation value being calculated based on at least one of:

a position command value,
an acceleration command value,
a speed command value, and
a torque command value, wherein said deflection compensation command section is equipped with a compensation extent determination section including a parameter determination section having at least one of:

1) an integrated thrust rigidity determination section for calculating an integrated thrust rigidity of the ball screw drive system based on said position command value, and for multiplying said acceleration command value by a reciprocal number of said integrated thrust rigidity; and 2) an integrated torsional rigidity determination section for calculating an integrated torsional rigidity of the ball screw drive system based on said position command value, and for multiplying said acceleration command value by a reciprocal number of said integrated thrust rigidity.

17. A position control apparatus according to claim 16, wherein said compensation extent determination section includes:

1) load-side inertial moment determination section for calculating a current load-side inertial moment based on at least one of:
said acceleration command value,
said torque command value,
a current motor speed,
said integrated thrust rigidity,
said integrated torsional rigidity, and
a load-side inertial moment in previous control cycle; and 2) a multiplier for calculating a deflection extent by multiplying the load-side inertial moment by the acceleration command value by the total amount of at least one of the reciprocal number of integrated rigidities.

18. A position control apparatus according to claim 17, wherein said load-side inertial moment determination section includes:

a constant acceleration period choosing section for choosing a constant acceleration period based on said acceleration command value;

a turbulence observer for calculating a turbulence torque based on said integrated thrust rigidity, said integrated torsional rigidity, the motor speed, said torque command value and said previous load-side inertial moment calculated in said previous control cycle; and an inertial moment arithmetic section for calculating a load-side inertial moment in said chosen constant-acceleration period based on said acceleration command value, said turbulence torque and said torque command value.

19. A semi-closed position control apparatus for controlling the position of an object, which is driven vial a ball screw drive system by a servomotor, by feedbacking based on a position command value representing the position of the object and by substituting a feed position of the servomotor for the position of the object as a position feedback, said apparatus comprising:

1) at least one of:
(a) a speed command value calculation section for calculating a speed command value by differentiating the position command value,
(b) an acceleration command value calculations section for calculating an acceleration command value by differentiating said speed command value,
(c) a torque command value acceleration calculation section for calculating a torque command value, which is a position command value of the servomotor, and
(d) a motor speed calculation section for calculating a motor speed based on the feed position of the servomotor;

2) a deflection compensation command section for outputting at least one of a deflection compensation value, a deflection speed compensation value and a deflection torque compensation value to compensate a control error due to a possible deflection of the ball screw drive system, based on at least one of said position command value, said acceleration command value, said torque command value and the motor speed;

3) a position deviation calculation section for calculating a position deviation based on said position command value, said deflection compensation value and said position feedback; and 4) a speed deviation calculation section for calculating a speed deviation, based on at least one of a value obtained by multiplying said position deviation by a predetermined constant, said speed command value, said deflection speed compensation value and a speed feedback obtained by differentiating said position feedback;

wherein the torque command value calculation section calculates a torque command value based on at least one of a value obtained by proportioning and integrating said speed deviation, a value obtained by multiplying said speed command value by a predetermined constant and said deflection compensation value.

20. A position control apparatus according to claim 19, wherein said deflection compensation command section is equipped with a compensation extent determination section including a parameter determination section having at least one of:

1) an integrated thrust rigidity determination section for calculating an integrated thrust rigidity of the ball screw drive system based on said position command value, and for multiplying said acceleration command value by a reciprocal number of said integrated thrust rigidity; and 2) an integrated torsional rigidity determination section for calculating an integrated torsional rigidity of the ball screw drive system based on said position command value, and for multiplying said acceleration command value by a reciprocal number of said integrated thrust rigidity.

21. A position control apparatus according to claim 20, wherein said compensation extent determination section includes:

1) a load-side inertial moment determination section for calculating a current load-side inertial moment based on at least one of:
said acceleration command value,
said torque command value, a current motor speed,
said integrated thrust rigidity,
said integrated torsional rigidity, and
a load-side inertial moment in previous control cycle; and 2) a multiplier for calculating a deflection extent by multiplying the load-side inertial moment by the acceleration command value by the total amount of at least one of the reciprocal number of integrated rigidities.

22. A position control apparatus according to claim 21, wherein said load-side inertial moment determination section includes:

a constant acceleration period choosing section for choosing a constant acceleration period based on said acceleration command value;

a turbulence observer for calculating a turbulence torque based on said integrated thrust rigidity, said integrated torsional rigidity, the motor speed, said torque command value and said previous load-side inertial moment calculated in said previous control cycle; and an inertial moment arithmetic section for calculating a load-side inertial moment in said chosen constant-acceleration period based on said acceleration command value, said turbulence torque and said torque command value.

23. A position control apparatus according to claim 19, wherein said deflection compensation command section includes:

a deflection acceleration compensation value calculation section for calculating a deflection acceleration compensation value by differentiating said deflection speed compensation value; and a torque compensation value calculating section for calculating a torque compensation value by differentiating said deflection speed compensation value and then multiplying the resulting differentiated value by predetermined constant.

24. A full-closed position control apparatus for controlling the position of an object, which is driven via a ball screw drive system by a servomotor, by feedback based on a position command value representing the position of the object and by employing a real position of the object as a position feedback, said apparatus comprising:

1) at least on of:
   (a) a speed command value calculation section for calculating a speed command value by differentiating the position command value,
   (b) an acceleration command value calculation section for calculating an acceleration command value by differentiating said speed command value,
   (c) a torque command value calculating section for calculating a torque command value, which is a position command value of the servomotor, and
   (d) a motor speed calculation section for calculating a motor speed based on the feed position of the servomotor;

2) a deflection compensation command section for outputting at least one of a deflection compensation value, a deflection speed compensation value and a deflection torque compensation value to compensate a control error due to a possible deflection of the ball screw drive system, based on at least one of said position command value, said acceleration command value, said torque command value and the motor speed;

3) a position deviation calculation a position deviation based on said position command value, said deflection compensation value and said position feedback; and 4) a speed deviation calculation section for calculating a speed deviation, based on at least one of a value obtained by multiplying said position deviation by a predetermined constant, said speed command value, said deflection speed compensation value and a speed feedback obtained by differentiating said position feedback;

wherein the torque command value calculation section calculates a torque command value based on at least one of a value obtained by proportioning and integrating said speed command deviation, a value obtained by multiplying said speed value by a predetermined constant and said deflection compensation value.

25. A position control apparatus according to claim 24, wherein said deflection compensation command section is equipped with a compensation extent determination section including a parameter determination section having at least one of:

1) an integrated thrust rigidity determination section for calculating an integrated thrust rigidity of the ball screw drive system based on said position command value, and for multiplying said acceleration command value by a reciprocal number of said integrated thrust rigidity; and 2) an integrated torsional rigidity determination section for calculating an integrated torsional rigidity of the ball screw drive system based on said position command value, and for multiplying said acceleration command value by a reciprocal number of said integrated thrust rigidity.

26. A position control apparatus according to claim 25, wherein said compensation extent determination section includes:

1) a load-side inertial moment determination section for calculating a current load-side inertial moment based on at least one of:
   said acceleration command value,
   said torque command value,
   a current motor speed,
   said integrated thrust rigidity, and
   a load side-inertial moment in previous control cycle; and 2) a multiplier for calculating a deflection extent by multiplying the load-side inertial moment by the acceleration command value by the total amount of at least one of the reciprocal number of integrated rigidities.

27. A position control apparatus according to claim 26, wherein said load-side inertial moment determination section includes:

a constant acceleration period choosing section for choosing a constant acceleration period based on said acceleration command value;

a turbulence observer for calculating a turbulence torque based on said integrated thrust rigidity, said integrated torsional rigidity, the motor speed, said torque command value and said previous load-side inertial moment calculated in said previous control cycle; and an inertial moment arithmetic section for calculating a load-side inertial moment in said chosen constant-acceleration period on said acceleration command value, said turbulence torque and said torque command value.

28. A position control apparatus according to claim 24, wherein said deflection compensation command section includes:

a deflection acceleration compensation value calculation section for calculating a deflection acceleration compensation value by differentiating said deflection speed compensation value; and a torque compensation value calculation section for calculating a torque compensation value by differentiating said deflection speed value and then multiplying the resulting differentiated value by a predetermined constant.

29. A full-closed position control apparatus for controlling the position of an object, which is driven via a ball screw drive system by a servomotor, by feedbacking based on a position command value representing the position of the object and by employing as a position feedback a value based on both a real position of the object and a feed position of the servomotor, said apparatus comprising:

1) at least one of:
   (a) a speed command value calculation section for calculating a speed command value by differentiating the position command value,
   (b) an acceleration command value calculation section for calculating an acceleration command value by differentiating said speed command value,
   (c) a torque command value calculation section for calculating a torque command value, which is a position command value of the servomotor, and
   (d) a motor speed calculation section for calculating a motor speed based on the feed position of the servomotor;

2) a deflection compensation command section for outputting at least one of a deflection compensation value, a deflection speed compensation value and a deflection torque compensation value to compensate a control error due to a possible deflection of the ball screw drive system, based on at least one of said position command value, said acceleration command value, said torque command value and the motor speed;

3) a position deviation calculation section for calculating a position deviation based on said position command value, said deflection compensation value and said position feedback; and 4) a speed deviation calculating section for calculating a speed deviation, based on at least one of a value obtained by multiplying said position deviation by a predetermined constant, said speed command value, said deflection speed compensation value and a speed feedback obtained by differentiating said position feedback;

wherein the torque command value calculation section calculates a torque command value based on at least one of a value obtained by proportioning and integrating said speed deviation, a value obtained by multiplying said speed command value by a predetermined constant and said deflection compensation value.

30. A position control apparatus according to claim 29, wherein said deflection compensation command section is equipped with a compensation extent determination section including a parameter determination section having at least one of:

1) an integrated thrust rigidity determination section for calculating an integrated thrust rigidity of the ball screw drive system based on said position command value, and for multiplying said acceleration command value by a reciprocal number of said integrated thrust rigidity; and 2) an integrated torsional rigidity determination section for calculating an integrated torsional rigidity of the ball screw drive system based on said position command value, and for multiplying said acceleration command value by a reciprocal number of said integrated thrust rigidity.

31. A position apparatus according to claim 30, wherein said compensation extent determination section includes:

1) a load-side inertial moment determination section for calculating a current load-side inertial moment based on at least one of:
   said acceleration command value,
   said torque command value,
   a current motor speed,
   said integrated thrust rigidity,
   said integrated torsional rigidity, and
   a load side-inertial moment in previous control cycle; and 2) a multiplier for calculating a deflection extent by multiplying the load-side inertial moment by the acceleration command value by the total amount of at least one of the reciprocal number of integrated rigidities.

32. A position control apparatus according to claim 31, wherein said load-side inertial moment determination section includes:

a constant acceleration period choosing section for choosing a constant acceleration period based on said acceleration command value;

a turbulence observer for calculating a turbulence torque based on said integrated thrust rigidity, said integrated torsional rigidity, the motor speed, said torque command value and said previous load-side inertial moment calculated in said previous control cycle; and an inertial moment arithmetic section for calculating a load-side inertial moment in said chosen constant-acceleration period based on said acceleration command value, said turbulence torque and said torque command value.

33. A position control apparatus according to claim 29, wherein said deflection compensation command section includes:

a deflection acceleration compensation value calculation section for calculating a deflection acceleration compensation value by differentiating said deflection speed compensation value; and a torque compensation value calculation section for calculating a torque compensation value by differentiating said deflection speed compensation value and then multiplying the resulting differentiating value by a predetermined constant.

* * * * *